(12) United States Patent
Ito (10) Patent No.: US 6,290,017 B1
(45) Date of Patent: Sep. 18, 2001

(54) BODY FRAME STRUCTURE OF A TWO-WHEELED MOTOR VEHICLE

(75) Inventor: Hiroyuki Ito, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/393,161

(22) Filed: Sep. 10, 1999

(30) Foreign Application Priority Data

Sep. 11, 1998 (JP) .................................................. 10-257929

(51) Int. Cl.⁷ .................................................. B62D 61/02
(52) U.S. Cl. .......................................... 180/227; 180/219
(58) Field of Search .................................. 180/219, 227, 180/311, 312; 280/283

(56) References Cited

U.S. PATENT DOCUMENTS

| | | |
|---|---|---|
| 4,706,774 | 11/1987 | Tsuboi . |
| 4,744,579 * | 5/1988 | Roatta ................................. 280/275 |
| 5,016,725 | 5/1991 | Muramatsu . |
| 5,284,221 * | 2/1994 | Warne ................................. 180/219 |
| 5,377,776 * | 1/1995 | Saiki ................................... 180/219 |
| 5,857,538 * | 1/1999 | Chambers .......................... 180/219 |
| 5,921,339 * | 7/1999 | Matsuura ............................ 180/219 |
| 5,975,230 * | 11/1999 | Bourget .............................. 180/225 |

FOREIGN PATENT DOCUMENTS

| | | | |
|---|---|---|---|
| 0330557A2 | 8/1989 | (EP) . | |
| 213577 * | 10/1985 | (JP) ................................... | 180/311 |
| A2-74487 | 3/1990 | (JP) . | |
| 5-77777 * | 3/1993 | (JP) ................................... | 180/311 |

* cited by examiner

Primary Examiner—Robert P. Olszewski
Assistant Examiner—Michael Cuff
(74) Attorney, Agent, or Firm—Birch, Stewart, Kolasch & Birch, LLP (57) ABSTRACT

A two-wheeled vehicle having a front end portion of a rear suspension attached to an upper part of a body frame. A reduction in weight and cost of the body frame is attained while permitting a fuel tank and a seat to be set at respective optimum heights without changing their shapes and sizes. In the body frame, a pair of right and left main frames are extended backwards and downwards from a head pipe, expanded portions are formed locally upward from straight portions of the main frames as seen from the side, and a cross member is mounted between the expanded portions. A front end portion of a rear suspension is attached to a vertical center of a rear side of the cross member and the rear suspension is extended substantially in parallel with the straight portions.

14 Claims, 6 Drawing Sheets

BODY FRAME STRUCTURE OF A TWO-WHEELED MOTOR VEHICLE

BACKGROUND OF THE INVENTION

1. Field of the Invention

The present invention relates to a body frame structure of a two-wheeled motor vehicle provided with a swing arm type rear suspension.

2. Description of the Background Art

Many two-wheeled motor vehicles are provided with a so-called swing arm type rear suspension. That is, a swing arm for a rear wheel is secured to a body frame and at the same time it is suspended from the body frame through a rear suspension. Generally, once characteristics of a rear suspension are determined, a layout relation thereof (e.g. mounting position and inclination) to a swing arm is mostly determined. This form of rear suspension is shown in a "saddle type vehicle" as disclosed in Japanese Patent Laid-open No. Hei 2-74487.

Figure 1:
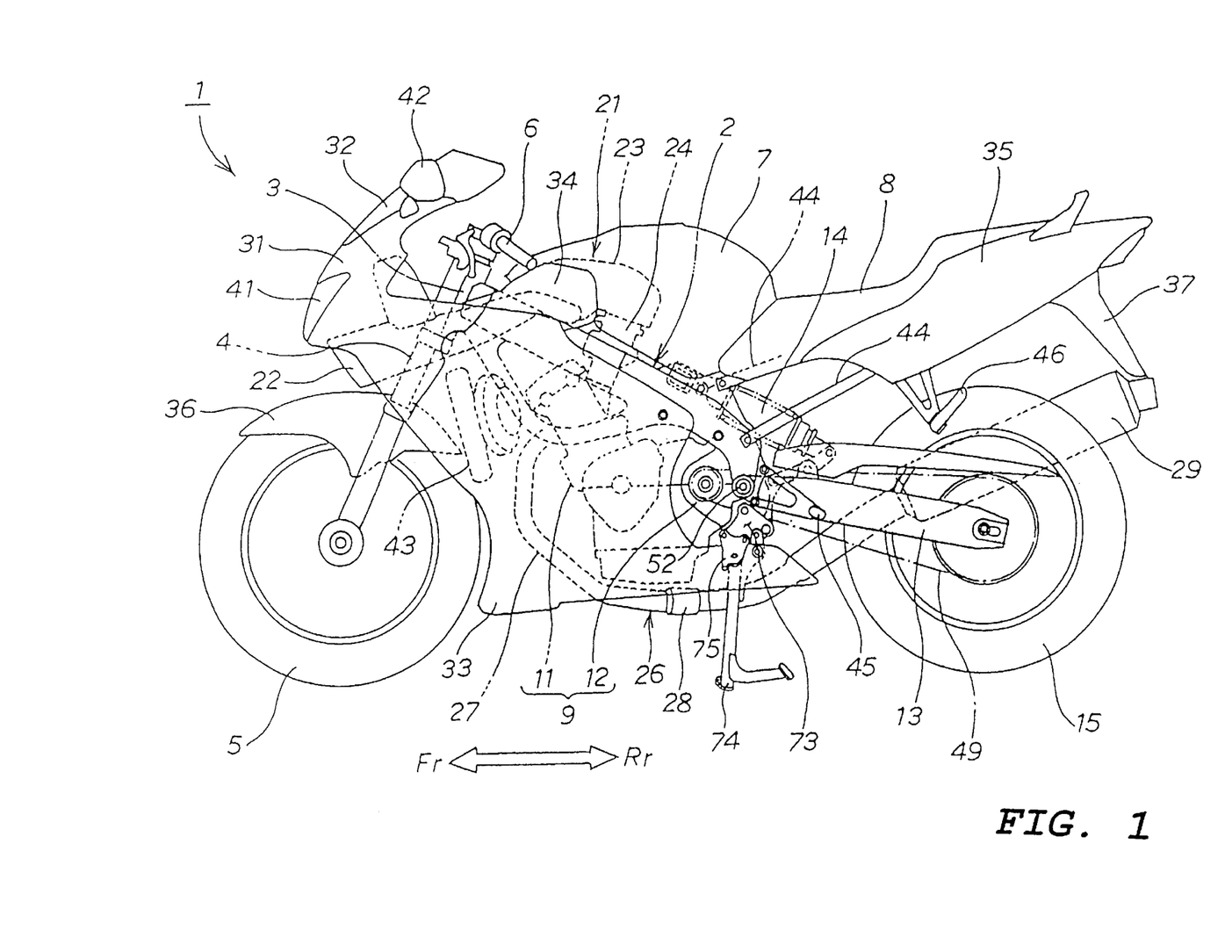
FIG. 1 is a side view of a two-wheeled motor vehicle according to the present invention.
Figure 2:
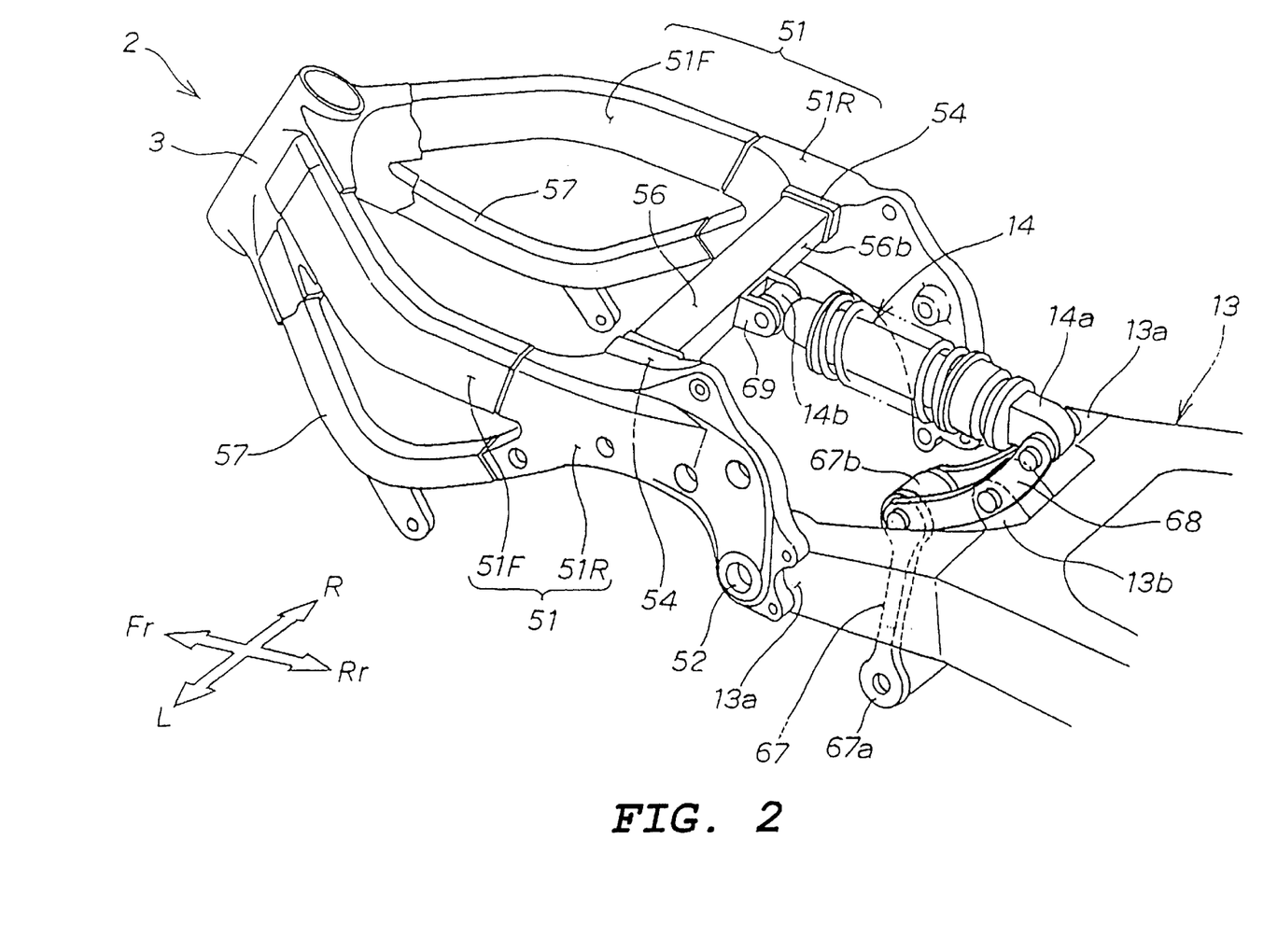
FIG. 2 is a perspective view of a body frame and a rear suspension both according to the present invention.
Figure 3:
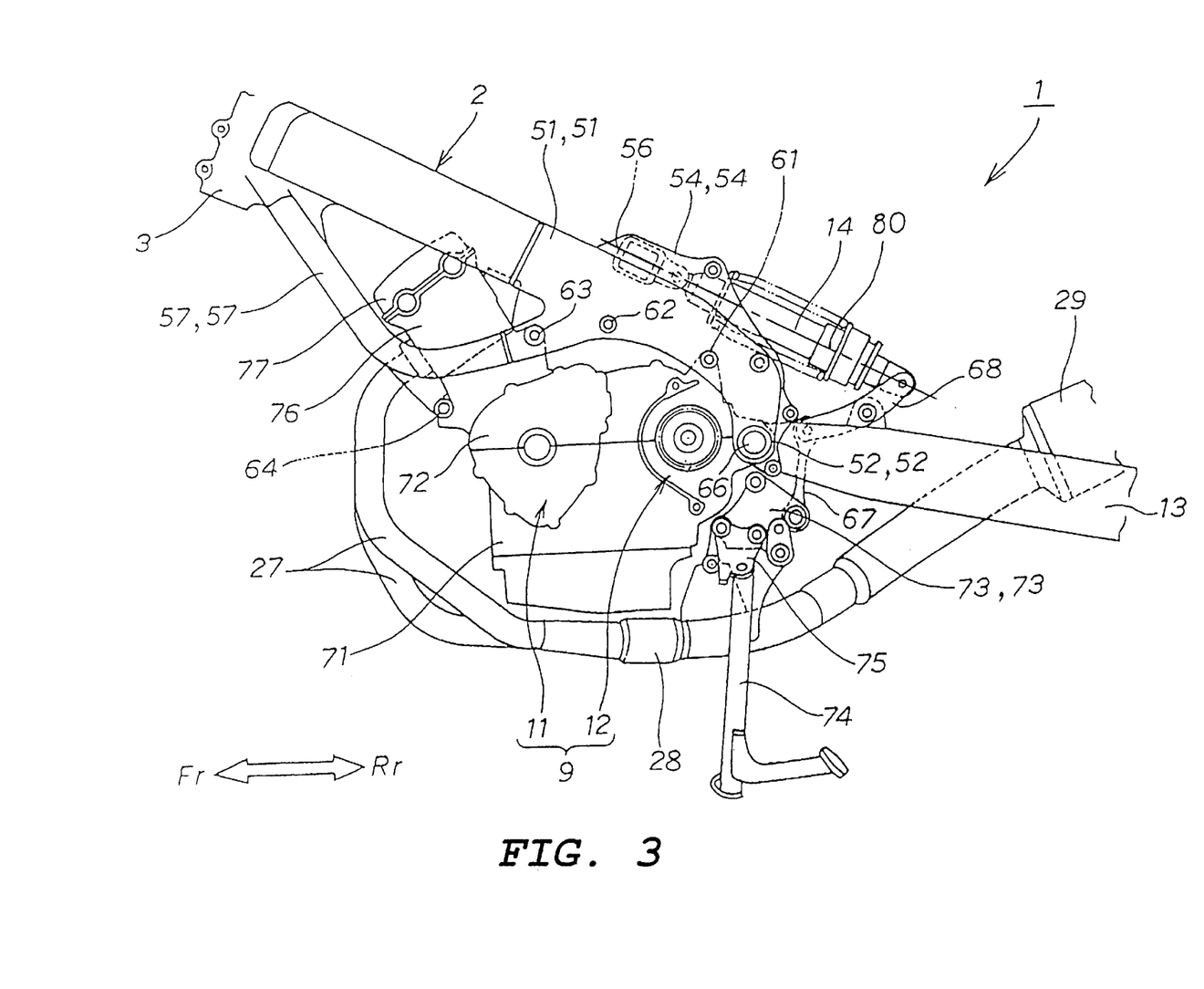
FIG. 3 is a side view of a principal portion of the two-wheeled motor vehicle.

According to FIGS. 1 to 3 and 6 of the publication, a pair of upper frame members are extended backward and downward from a head pipe 4, a front end portion of a rear fork is mounted between rear lower portions of the upper frame members 14, a rear end portion of a damper 8 is secured to a longitudinally intermediate position of the rear fork, and a front end portion of the damper 8 is attached to a cross member 15 mounted between the upper frame members 14. FIGS. 2 and 3 show the cross member 15 mounted between straight portions of the upper frame members 14 as seen from the side, an arm (with no reference numeral affixed thereto) is extended upwardly from the cross member 15 and the front end portion of the damper 8 is attached to an upper end of the arm, so that the damper 8 extends nearly in parallel with the above straight portions. Thus, the front end portion of the damper 8 is secured to the cross member 15 in an offset manner with the side view.

It is desirable that the center of gravity of the two-wheeled motor vehicle 1 be as low as possible, and it is therefore desirable that fuel tank 11 be disposed at a low position on the vehicle. The height of the fuel tank 11, which is disposed in front of a seat 12, is set so as to be appropriate in vehicular driving relative to the level of the seat 12. In view of these points it is also desired that the upper frame members 14 extending below the fuel tank 11 be positioned low on the vehicle.

In the above conventional technique, the upper frame members 14 are positioned relatively low and the damper 8 is disposed above the upper frame members 14 and substantially in parallel with the straight portions of the upper frame members with side view.

As shown in FIG. 2 of the above publication, the front end portion of the damper 8 is attached to the cross member 15 in an upwardly offset manner. Consequently, a torsional moment is induced in the cross member 15 due to the eccentric load of the damper 8. Thus, it is required that the rigidity of the cross member 15 be enhanced, which results in an increase in both weight and cost.

One measure for preventing such an inconvenience is to raise the height of the cross member 15 up to the level of the front end portion of the damper 9. This can be done by raising the height of the entire upper frame members 14 up to the level of the cross member 15. However, if the upper frame members 14 are raised, they will interfere with the edge of the fuel tank 11 or of the seat 12. To avoid this interference, the edge of the fuel tank 11 or of the seat 12 must be made wider. However, this is undesirable because an increase of the vehicle width will result.

Accordingly, in connection with a two-wheeled motor vehicle having a front end portion of a rear suspension damper 9 attached to an upper part of a body frame, it is an object of the present invention to provide a technique capable of (1) reducing the weight and cost of the body frame and (2) setting a fuel tank and a seat at optimum heights without changing their shapes and sizes.

SUMMARY OF THE INVENTION

In order to achieve the above-mentioned objects, a two-wheeled motor vehicle is disclosed having a pair of right and left main frames extending backward and downward from a head pipe, a cross member mounted between straight portions of the main frames as seen from the side, and a front end portion of a rear suspension secured to the cross member. The rear suspension extends approximately in parallel with the straight portions, and a body frame structure is provided having expanded portions formed locally upward from the straight portions of the main frames. The cross member is mounted between the expanded portions, and the front end portion of the rear suspension is secured to a vertical center of the rear side of the cross member.

Because the front end portion of the rear suspension is attached to the center of the cross member, an eccentric load exerted on the cross member from the rear suspension will be decreased. The cross member has a margin in point of rigidity because a torsional moment is not induced therein. As a result, the diameter and thickness of its material can be made much smaller, and a reduction in weight and cost of the body frame can be attained.

It is only the locally expanded portions that project upward from the main frames, with the cross member being mounted between the expanded portions. Thus, because of a local projection, there is no danger of interference of the main frames with the edge of a fuel tank or of a seat. Therefore, it is not necessary to change the shapes and sizes of the fuel tank and the seat. In addition, it is possible to set them at optimum heights.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention will be described below with reference to the accompanying drawings. In the following description, "front," "rear," "left," "right," "upper," and "lower" indicate directions as seen from the vehicle rider side. Further, Fr, Rr, L, and R stand for front, rear, left, and right sides, respectively.

FIG. 1 is a side view of a two-wheeled motor vehicle according to the present invention. The two-wheeled motor vehicle, indicated at 1, comprises a body frame (body) 2, a front fork 4 secured to a head pipe 3 of the body frame 2, a front wheel 5 secured to the front fork 4, a handle 6 connected to the front fork 4, a fuel tank 7 mounted on an upper front portion of the body frame 2 so as to straddle the same portion, a seat 8 mounted on an upper rear portion of the body frame 2, a power unit 9 (a combination of a front engine 11 and a rear transmission 12) mounted on a lower front portion of the body frame 2, a swing arm (rear fork) 13 attached to a lower rear portion of the body frame 2, a rear suspension 14 through which the swing arm 13 is suspended at an intermediate position from the body frame 2, and a rear wheel 15 secured to a rear end portion of the swing arm 13. An intake system 21 of the engine 11 comprises an intake duct 22, an air cleaner 23, and a carburetor 24. An exhaust system 26 of the engine 11 comprises four exhaust pipes 27, with only one shown in the figure, a manifold 28 which gathers the exhaust pipes 27, and a muffler 29.

The two-wheeled motor vehicle 1 is a full cowling type vehicle comprising an upper cowl 31 which covers the upper front portion of the body frame 2, a windscreen 32 mounted on top of the upper cowl 31, side cowls 33 which cover side portions of the body frame 2, a duct cover 34 which covers a rear side portion of the intake duct 22, a seat cowl 35 which covers the portion located under the seat 8 at the rear portion of the body frame 2, a front fender 36 which covers the front wheel 5 from above, and a rear fender 37 which covers the rear portion of the rear wheel 15 from above. In the figure, the numeral 41 denotes a head lamp, numeral 42 denotes a mirror, 43 a radiator, 44 a seat rail, 45 a rider step, 46 a passenger step, and 49 a drive chain.

FIG. 2 is a perspective view of a body frame and a rear suspension according to the present invention. The body frame 2 comprises a pair of right and left main frames 51 extending backward and downward from the head pipe 3, the rear ends of the main frames 51 being extended downward, with right and left pivot support portions 52 (only the left one is shown in the figure) being formed in the lower ends of the downwardly extended main frames, a cross member 56 mounted between longitudinally central positions of the main frames 51, and right and left sub-frames 57 mounted between the lower portion of the head pipe 3 and the lower portions of the longitudinally central portions of the main frames 51. The sub-frames 57 are generally in an asymmetric v-like shape in a side view.

The head pipe 3 and rear portions SIR of the main frames 51 are formed by aluminum castings, while front portions 5IF of the main frames 51 and the sub-frames 57 are formed by aluminum extrusions. These components may be bonded together by welding.

FIG. 3 is a side view of a principal portion of the two-wheeled motor vehicle. The power unit 9 is mounted to the body frame 2 through four hanger portions 61 to 64. The engine 11 is a water-cooled type four-cylinder engine which is largely inclined forward and upward. In the engine 11, a lower-half crank case 71 and an upper-half cylinder block 72 also serve as a transmission case. A main stand 74 and a side stand mounting bracket 75 are mounted to the rear portion of the crank case 71 through right and left stand mounting brackets 73 (only the left one is shown in the figure). The numeral 76 denotes a cylinder head and numeral 77 denotes a head cover. From FIG. 3, it can be seen that an extension of a longitudinal axis 80 of the rear suspension 14 intersects with the cross member 56.

Figure 4:
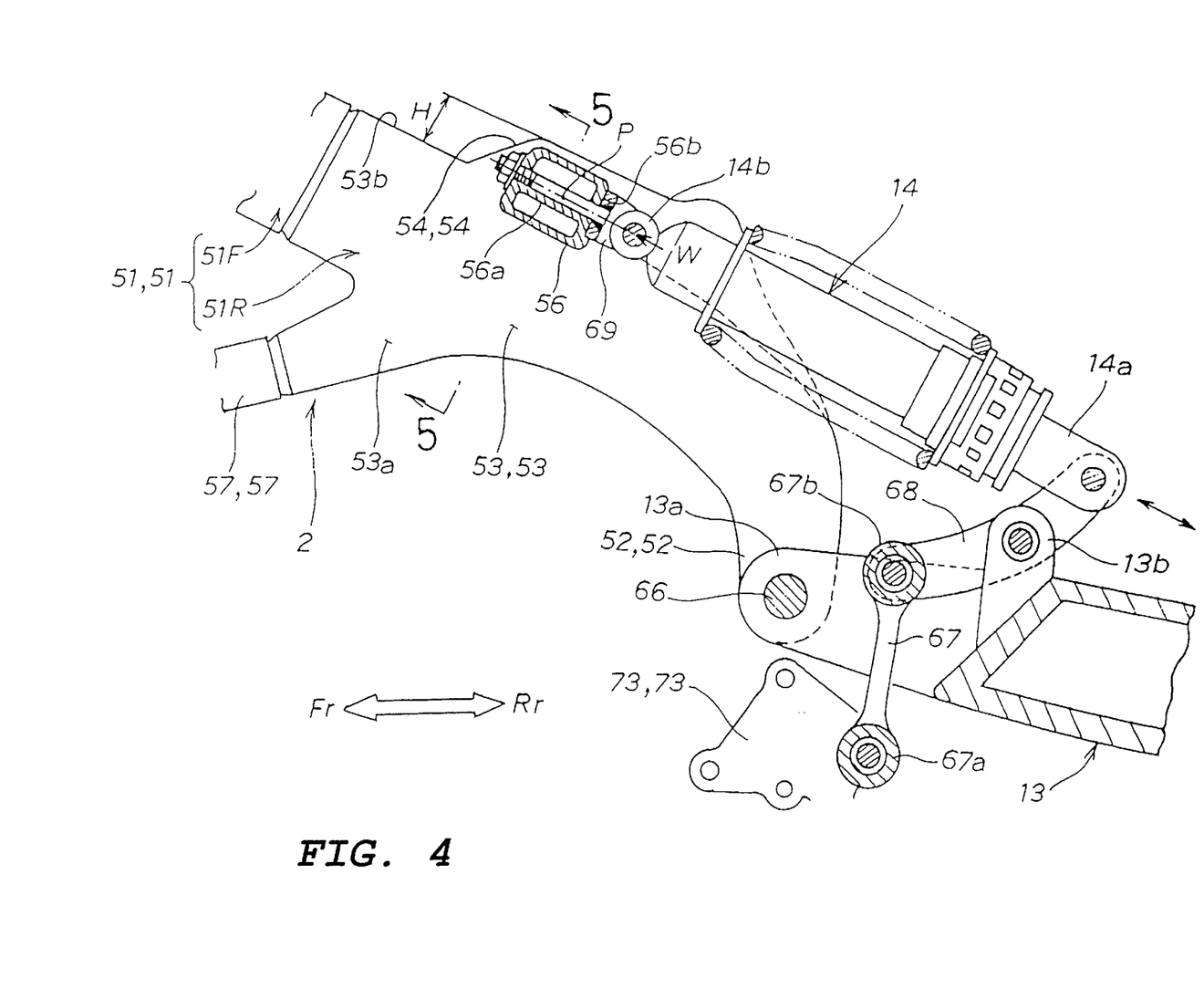
FIG. 4 is a sectional side view of the body frame and a swing arm suspending structure (a rear suspension) both according to the present invention.

FIG. 4 is a sectional side view of the body frame and a swing arm suspending structure (a rear suspension) according to the present invention. The right and left main frames 51 have right and left expanded portions 54 expanded locally upward from straight portions 53 of the frames when seen from the side (from the surface side of the figure), with the cross member 56 being mounted between the expanded portions 54. The cross member 56 is mounted at positions near base portions 53a of the sub-frames 57 in the straight portions 53. The base portions are rigid enough against a bending moment exerted thereon from the cross member 56. The cross member 56 is a square pipe formed by an aluminum extrusion, and a lateral rib 56a is integrally formed in the interior of the cross member.

Figure 5:
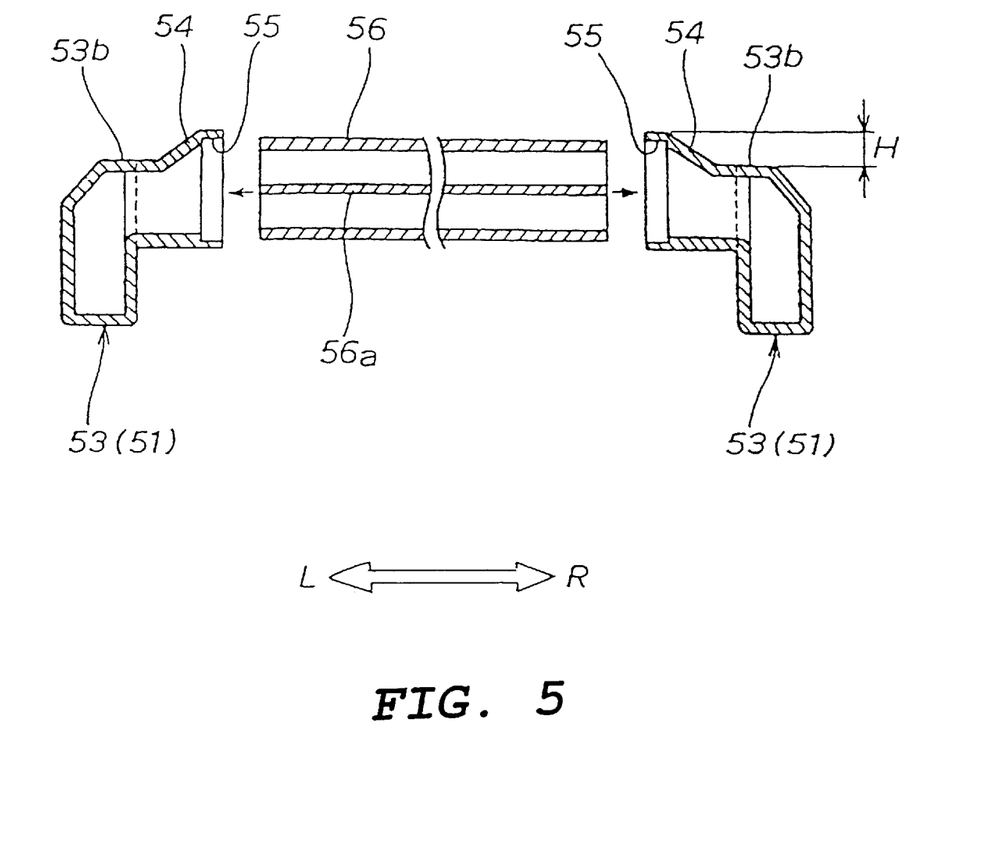
FIG. 5 is a sectional view taken on line 5—5 in FIG. 4.

FIG. 5 is a sectional view taken on line 5—5 in FIG. 4, showing the relation between the right and left main frames 51 and the cross member 56. The straight portions 53 of the right and left main frames 51 have a long square pipe-like section. The right and left expanded portions 54 are locally expanded 10 by only a height H upward from upper surfaces 53b of the straight portions 53 and toward the center in the vehicular transverse direction. The expanded portions 54 have respective fitting holes 55 opposed to each other. The cross member 56 is fitted at the ends thereof into the fitting holes 55 and is then fixed by welding to the edges of the holes 55.

Turning back to FIG. 4, the suspending structure for the swing arm 13 is a progressive suspension structure comprising the following structural points (1) to (5): (1) front end portions 13a of the swing arm 13 are vertical pivotally connected to the right and left pivot support portions 52 through pivot shafts 66; (2) one end portion 67a of a first link 67 is connected to the right and left stand mounting brackets 73; (3) three points, including an opposite end portion 67b of the first link 67, a front upper portion 13b of the swing arm 13, and a rear end portion 14a of the rear suspension 14, are connected together through a second link 68; (4) the rear suspension 14 is extended substantially in parallel with the straight portions 53 of the main frames 51; and (5) a front end portion 14b of the rear suspension 14 is vertically pivotally connected to a vertical center P of a rear side 56b of the cross member 56 through a fork end 69.

Figure 6:
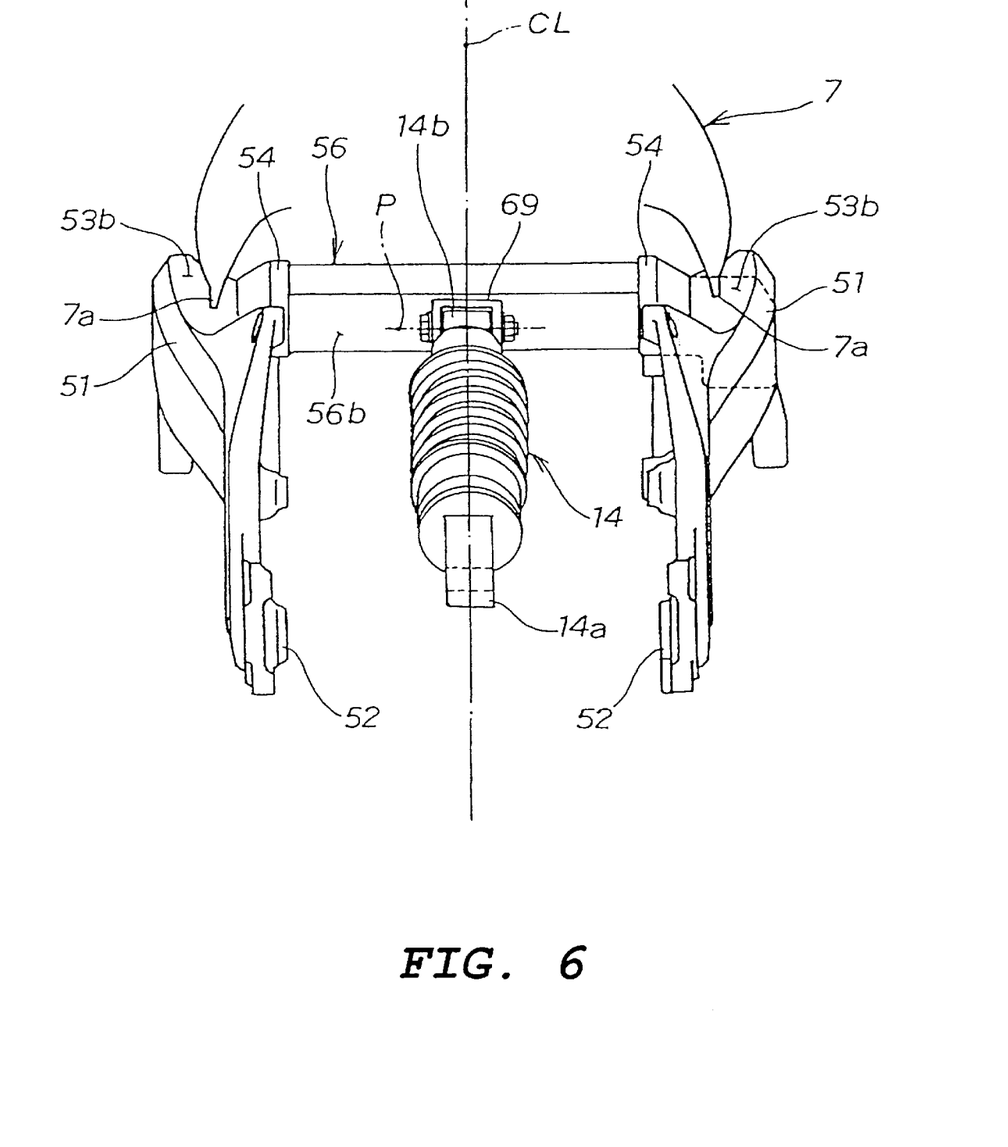
FIG. 6 is a rear view of the body frame and the swing arm suspending structure.

FIG. 6 is a rear view of the body frame and the swing arm suspending structure according to the present invention, showing that the rear suspension 14 is disposed on a body center CL. The operation of the body frame 2 constructed as above will be described below with reference to FIGS. 4 and 6. As shown in FIG. 4, the front end portion 14b of the rear suspension 14 is connected to the vertical center P of the rear side 56b of the cross member 56. A load W from the rear suspension 14 acts on the vertical center P of the cross member 56 through the fork end 69. That is, no eccentric load is imposed on the cross member 56 from the rear suspension 14. Consequently, a torsional moment is not developed in the cross member 56.

On the other hand, because both ends of the cross member 56 are fixed respectively to the right and left expanded portions 54, a bending moment is induced in the cross member 56 under the action of load W. Thus, the cross member 56 undergoes only a bending moment due to load W with no torsional moment induced therein, and therefore it has a margin in point of rigidity. That is, the diameter and thickness of its material can be reduced, resulting in a reduction in both weight and cost of the body frame 2.

As shown in FIG. 6, the right and left expanded portions 54 are locally projected upward from the main frames 51 and toward the vehicular body center CL, and the cross member 56 is mounted between both expanded portions 54. Because the expanded portions 54 are projected toward the vehicular body center CL, even if the expanded portions overlap edges 7a of the fuel tank 7, or overlap an edge of the seat 8 (see FIG. 1), there is no danger of mutual interference. Further, because the expanded portions 54 project locally, the height of the upper surfaces 53b of the main frames 51 can be set to an optimum level. Thus, there is no danger that the main frames 51 may interfere with the edges 7a of the fuel tank 7, or with the edge of the seat 8.

As will be seen from the above description, it is not necessary to change the shapes and sizes of the fuel tank and the seat 8. Besides, these components can be set at optimum heights and the height of the cross member 56 can be easily raised to the level of the front end portion 14b of the rear suspension 14.

In the above embodiment: (1) The rear suspension is not limited to the progressive suspension insofar as it is a swing arm type; (2) in the rear suspension 14, placement of the rear end portion 14a and the front end portion 14b may be exchanged; (3) it is optional whether the fork end 69 is present or not insofar as the front end portion 14b of the rear suspension 14 is vertically pivotally connected to the vertical center P of the rear side 56b of cross member 56; (4) the shape and size of the right and left expanded portions 54 are arbitrary if only the expanded portions are projected locally upward from the main frames 51; and (5) the cross member 56 is not limited to a square pipe, it may, for example, be a round pipe, of a polygonal cross section, or it may be formed of a solid material.

The above construction of the present invention conveys many advantages: Because the front end portion of the rear suspension is attached to the vertical center of the rear side of the cross member, an eccentric load is not exerted on the cross member from the rear suspension, resulting in no torsional moment development in the cross member. Therefore, the cross member has a margin in its rigidity and hence the diameter and thickness of the material can be reduced, resulting in a reduction in weight and cost of the body frame. Moreover, because expanded portions are formed locally upward from the straight portions of the main frames and the cross member is mounted between those expanded portions, the upper surface height of the mains frames can be set to an optimum level despite the height of the cross member being raised to the level of the front end portion of the rear suspension. Accordingly, interference between the main frames and the fuel tank edges or seat edges might be raised.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A body frame structure for a two-wheeled vehicle having a front and a rear, the structure comprising:
    a head pipe;
    a right main frame extending rearward from the head pipe, having a front and a rear portion;
    a left main frame extending rearward from the head pipe, having a front and a rear portion;
    a cross member fixed between the right and left main frames;
    a rear suspension mounted to the cross member and having a longitudinal axis, wherein an extension of the longitudinal axis of the rear suspension intersects with the cross member; and
    expanded portions on upper portions of the right and the left main frames, the cross member being mounted between the expanded portions of the main frames.

2. The body frame structure according to claim 1, further including a fork end attached to a rear side of the cross member, the rear suspension being pivotally attached to the cross member at the fork end.

3. The body frame structure according to claim 1, wherein the expanded portions of the main frames extend above upper surfaces of the main frames, each expanded portion having a respective fitting hole for receiving an end of the cross member.

4. The body frame structure according to claim 1, wherein the right and the left main frames each include sections which are substantially linear, and the rear suspension is substantially parallel with these sections.

5. The body frame structure according to claim 1, further including:
    a right subframe extending from the head pipe and fixed to the rear portion of the right main frame; and a left subframe extending from the head pipe and fixed to the rear portion of the left main frame.

6. The body frame structure according to claim 1, further comprising:

a left pivot support portion located at an end of the rear portion of the left main frame;

a right pivot support portion located at an end of the rear portion of the right main frame; and a swing arm pivotally mounted to the pivot support portions.

7. A body frame structure for a two-wheeled vehicle having a front and a rear, the structure comprising:

a head pipe;

a right main frame extending from the head pipe towards the rear of the vehicle;

a left main frame extending from the head pipe towards the rear of the vehicle;

a cross member fixed between the right and left main frames;

expanded portions on an upper portion of the right and the left main frames; and a support member fixed to a rear side of the cross member.

8. The body frame structure according to claim 7, wherein the support member includes a fork end attached to the rear side of the cross member.

9. The body frame structure according to claim 7, wherein the cross member is an elongated member having respective ends fixed to the right and left main frames.

10. The body frame structure according to claim 1, wherein the right and left main frames each include sections which are substantially linear.

11. The body frame structure according to claim 10, wherein the support member includes a fork end attached to the rear side of the cross member, the fork end having right and left support arms which extend from the cross member in a direction which is substantially parallel to the substantially linear sections of the right and left main frames.

12. The body frame structure according to claim 7, wherein the expanded portions of the main frames extend above upper surfaces of the main frames, each expanded portion having a respective fitting hole for receiving an end of the cross member.

13. The body frame structure according to claim 7, further including:

a right subframe extending from the head pipe and fixed to a rear portion of the right main frame; and a left subframe extending from the head pipe and fixed to a rear portion of the left main frame.

14. The body frame structure according to claim 10, further including a rear suspension pivotally attached to the support member, and extending substantially parallel to the linear sections of the main frames.

* * * * *